United States Patent
Yu et al.

(10) Patent No.: US 10,821,561 B2
(45) Date of Patent: Nov. 3, 2020

(54) EXOTHERMIC WELDING CUP AND EXOTHERMIC WELDING CAPSULE

(71) Applicant: SUNLIGHT CHENGDU XIHANGGANG ELECTRIC MANUFACTURING CO., LTD., Chengdu (CN)

(72) Inventors: Xudong Yu, Chengdu (CN); Fanjiao Chen, Chengdu (CN); Zhoubo Lyu, Chengdu (CN)

(73) Assignee: SUNLIGHT CHENGDU XIHANGGANG ELECTRIC MANUFACTURING CO., LTD., Chengdu (CN)

( * ) Notice: Subject to any disclaimer, the term of this patent is extended or adjusted under 35 U.S.C. 154(b) by 0 days.

(21) Appl. No.: 16/481,967

(22) PCT Filed: Dec. 7, 2018

(86) PCT No.: PCT/CN2018/119695
§ 371 (c)(1),
(2) Date: Jul. 30, 2019

(87) PCT Pub. No.: WO2019/137124
PCT Pub. Date: Jul. 18, 2019

(65) Prior Publication Data
US 2019/0389014 A1    Dec. 26, 2019

(30) Foreign Application Priority Data

Jan. 15, 2018  (CN) .................... 2018 2 0065601 U

(51) Int. Cl.
*B23K 20/00* (2006.01)
*B23K 37/06* (2006.01)
(Continued)

(52) U.S. Cl.
CPC ............ *B23K 37/06* (2013.01); *B23K 1/0006* (2013.01); *B23K 20/165* (2013.01); *B23K 23/00* (2013.01); *B65D 25/34* (2013.01); *B65D 77/20* (2013.01)

(58) Field of Classification Search
CPC .... B23K 37/06; B23K 1/0006; B23K 20/165; B23K 23/00; B65D 25/34; B65D 77/20
(Continued)

(56) References Cited

U.S. PATENT DOCUMENTS 4,879,452 A * 11/1989 Kovarik ................. B23K 23/00
                                                    219/130.4
4,885,452 A * 12/1989 Amos .................... B23K 23/00
                                                    219/130.4
(Continued)

FOREIGN PATENT DOCUMENTS

CA    2474453 A1 *  8/2003  ............ B23K 23/00
CN    201144064 Y    11/2008
(Continued)

OTHER PUBLICATIONS

Machine translation of CN107030372A (no date available).*
(Continued)

*Primary Examiner* — Kiley S Stoner
(74) *Attorney, Agent, or Firm* — Hauptman Ham, LLP

(57) ABSTRACT

An exothermic welding cup and an exothermic welding capsule, wherein the exothermic welding cup comprises a cup, a cover and an igniter; the cup is used to accommodate welding powder, the cup has an opening, and the cover is used to cover the opening; the igniter comprises a heating portion disposed in the cup, and the heating portion has an insulating member and a heating member; and the insulating member is disposed between the heating member and the cover. The exothermic welding cup can avoid the shorting (Continued)

caused by the contact between the heated heating member and the cover. Also, an encapsulation ring disposed between the cover and the cup is configured to seal the welding powder within the cup so as to prevent the powder from falling out, and the encapsulation ring made of stainless steel ensures effective encapsulation of the welding powder within a certain welding time.

16 Claims, 7 Drawing Sheets

(51) Int. Cl.
    *B23K 23/00*     (2006.01)
    *B23K 1/00*     (2006.01)
    *B23K 20/16*     (2006.01)
    *B65D 25/34*     (2006.01)
    *B65D 77/20*     (2006.01)

(58) Field of Classification Search
    USPC .................................................... 228/234.3
    See application file for complete search history.

(56) References Cited

U.S. PATENT DOCUMENTS

| | | | | |
|---|---|---|---|---|
| 5,425,496 A | * | 6/1995 | Zhu | H05B 3/06 228/179.1 |
| 7,946,466 B1 | * | 5/2011 | Lofton | B23K 23/00 228/18 |
| 7,950,568 B2 | * | 5/2011 | Stidham | B22C 9/06 164/53 |
| 2004/0222274 A1 | * | 11/2004 | Harger | B23K 23/00 228/234.3 |
| 2011/0132967 A1 | * | 6/2011 | Lofton | B22D 19/04 228/33 |
| 2011/0240244 A1 | * | 10/2011 | Sepelak | B22D 19/04 164/54 |
| 2015/0328716 A1 | * | 11/2015 | Duart Lvarez Cienfuegos | B23K 23/00 164/54 |
| 2019/0143446 A1 | * | 5/2019 | Yu | B23K 23/00 164/54 |

FOREIGN PATENT DOCUMENTS

| | | | | |
|---|---|---|---|---|
| CN | 107030372 A | | 8/2017 | |
| CN | 207788042 U | | 8/2018 | |
| ES | 2384850 A1 | * | 7/2012 | ................ F42B 3/10 |

OTHER PUBLICATIONS

Machine translation of CN207788042A (no date available).*
Machine translation of CN201144064A (no date available).*
International Search Report dated Feb. 27, 2019, issued in corresponding International Application No. PCT/CN2018/119695.

* cited by examiner

EXOTHERMIC WELDING CUP AND EXOTHERMIC WELDING CAPSULE

RELATED APPLICATIONS

The present application is a National Phase of International Application Number PCT/CN2018/119695, filed Dec. 7, 2018, and claims the priority of China Application No. 201820065601.4, filed Jan. 15, 2018.

FIELD OF THE INVENTION

The present disclosure relates to the field of exothermic welding tools, and more particularly to an exothermic welding cup and an exothermic welding capsule.

BACKGROUND OF THE INVENTION

At present, the ignition of welding flux generally adopts a mode of igniting the welding flux with an ignition agent, whereas the ignition agent is highly unstable, lowering the safety factor; and the mode of igniting the welding flux with an ignition agent increases the cost, which is unfavorable for industrial production. For the current technology in the art, a continuous and stable high temperature for igniting the welding flux is difficult to be achieved in a short time, thus the mode of using ignition agent has to be used until now.

In a case of encapsulating welding powder, one problem is that the timeliness of the encapsulation is difficult to be ensured, while the other problem is that the encapsulation is prone to failure during use, causing poor welding effect.

During the welding process after the completion of the encapsulation, igniting parts may also come into contact with the other metal parts easily, resulting in failure of exothermic process, and failure of igniting.

BRIEF SUMMARY OF THE INVENTION

The present disclosure provides an exothermic welding cup and an exothermic welding capsule, aiming to solve the aforementioned problems of the exothermic welding cup and the exothermic welding capsule in the prior art.

The present disclosure is realized as follows:

An exothermic welding cup, comprises a cup, a cover and an igniter, wherein the cup is used to accommodate welding powder, the cup has an opening, and the cover is used to cover the opening;

the igniter comprises a heating portion;

the heating portion is disposed in the cup, and the heating portion has an insulating member and a heating member; and the insulating member is disposed between the heating member and the cover.

In one example of the present disclosure, the heating member is a spiral heating wire, and the insulating member comprises two insulating rods, wherein one of the insulating rods is disposed on one end of the spiral heating wire, while the other of the insulating rods is disposed on the other end of the spiral heating wire.

In one example of the present disclosure, the igniter further comprises a connecting line for connecting to a power supply, the heating member is crimped to the connecting line by a spring leaf which is also known as a connector terminal, the spring leaf has an extension section extending toward the cover, and the insulating member is an insulating tip fixedly disposed at an end of the extension section.

In one example of the present disclosure, the insulating tip is a PVC block or a silica gel block.

In one example of the present disclosure, a connector is disposed at one end of the connecting line remote from the igniter, the connector comprises a socket, a conductive layer is disposed on an inner wall of the socket, and the conductive layer is connected to the connecting line.

In one example of the present disclosure, an encapsulation ring is further comprised, the encapsulation ring comprises a first pressing surface and a second pressing surface, a flanging is disposed on a surface of the cup on which the opening is disposed, the flanging has a first surface close to the cup and a second surface remote from the cup, the cover covers the second surface, the first pressing surface of the encapsulation ring presses the cover tightly, and the second pressing surface presses the first surface tightly.

In one example of the present disclosure, a first through hole is disposed in the middle of the encapsulation ring.

In one example of the present disclosure, the encapsulation ring has a wire slot, and the wire slot is used for the connecting line to pass therethrough.

In one example of the present disclosure, the cup is a copper cup.

An exothermic welding capsule, comprises the aforementioned exothermic welding cup and welding flux, wherein the welding flux is disposed within the cup.

Beneficial effects of the present disclosure are as follows: the exothermic welding cup provided in the present disclosure can avoid contact between the heated heating member and the cover, which the latter may cause shorting; and the encapsulation ring configured to seal the welding powder within the cup can prevent the powder from falling out, and in practical welding process, the encapsulation ring made of stainless steel is not prone to failure, ensuring effective encapsulation of the welding powder in the cup within a certain welding time.

BRIEF DESCRIPTION OF THE DRAWINGS

In order to illustrate the technical solutions of the examples of the present disclosure more clearly, the drawings used in the embodiments are briefly introduced below; it should be understood that, the following drawings merely show some examples of the present disclosure, and should not be viewed as limiting the scope; and persons of ordinary skill in the art, without creative efforts, can still obtain other relevant drawings according to these drawings.

Figure 1:
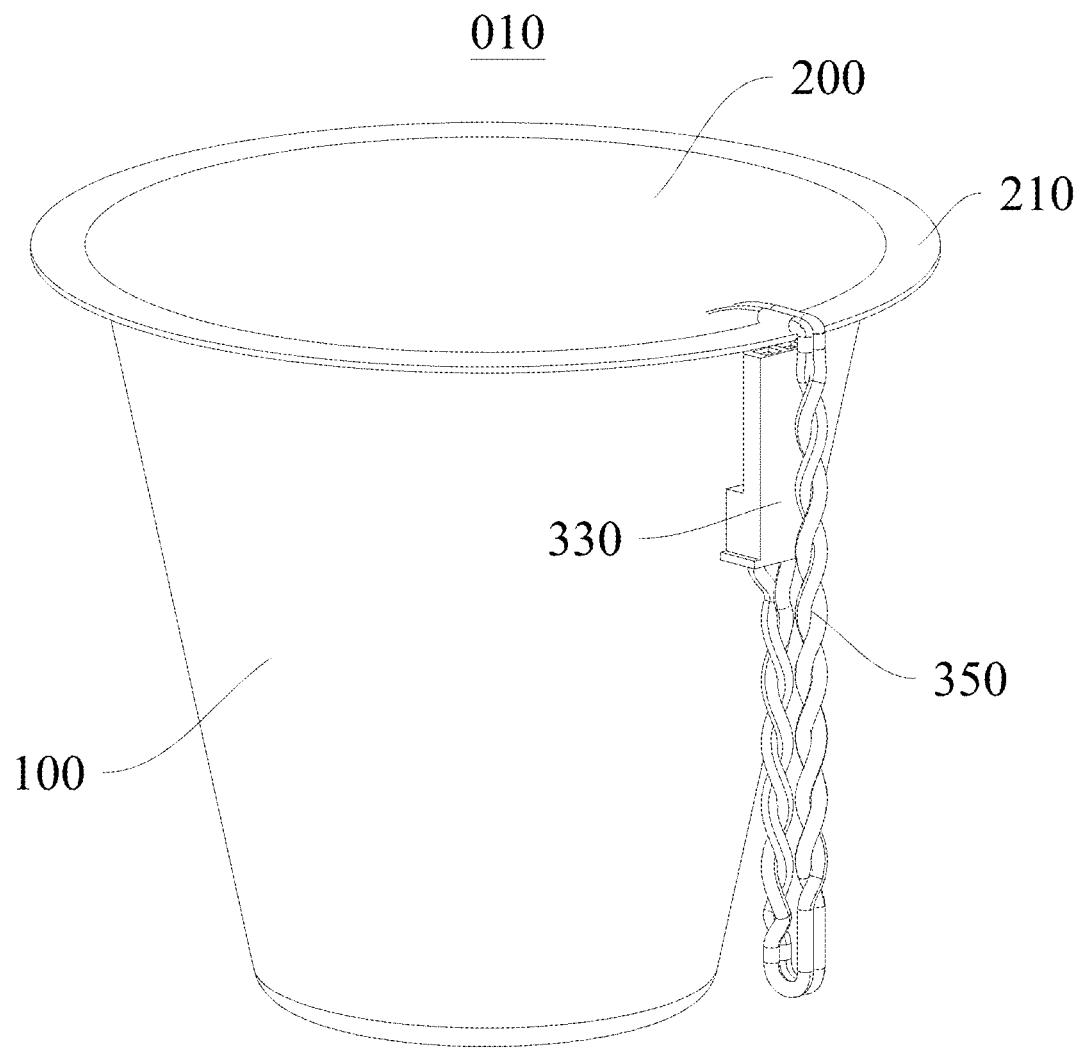
FIG. 1 is a schematic structural diagram of an exothermic welding capsule provided in the example of the present disclosure, viewed from a first viewing angle.

Annotations in figures: 010—exothermic welding cup; 100—cup; 200—cover; 300—igniter; 101—accommodating space; 110—opening; 111—flanging; 310—heating portion; 330—connector; 350—connecting line; 311—heating member; 313—insulating member; 315—spring leaf; 3151—extension section; 210—encapsulation ring; 211—first pressing surface; 213—second pressing surface; 215—wire slot.

DETAILED DESCRIPTION OF THE PREFERRED EMBODIMENTS

In order to make the objects, technical solutions and advantages of the examples of the present disclosure clearer, the technical solutions in the examples of the present disclosure will be described below clearly and completely in combination with the figures in the examples of the present disclosure, apparently, the examples described are merely some of, not all of the examples of the present disclosure. Based on the examples of the present disclosure, all the other examples obtained by persons of ordinary skill in the art without any creative efforts, shall fall within the protection scope of the present disclosure. Therefore, the following detailed description below of the examples of the present disclosure provided in the figures is not intended to limit the scope of the present disclosure as claimed herein, but merely illustrates chosen examples of the present disclosure. Based on the examples of the present disclosure, all the other examples obtained by persons of ordinary skill in the art without any creative efforts, shall fall within the protection scope of the present disclosure.

In the description of the present disclosure, it should be understood that, the terms indicating orientations or positional relationships indicated are based on orientations or positional relationships as shown in the figures, merely for facilitating describing the present disclosure and simplifying the description, rather than indicating or implying that the indicated devices or elements must have the specific orientations, or be configured and operated in specific orientation, therefore, they should not be construed as limiting the present disclosure.

In the present disclosure, unless otherwise clearly specified and defined, terms such as "mount", "couple", "connect" and "fix" should be construed in a broad sense. For example, it can be either fixed connection, or detachable connection, or formed as a single piece; it can be either mechanical connection, or electrical connection; and it can be either direct connection, or indirect connection through an intermediate medium, and be inner communication between two elements or relationship of two elements. For persons of ordinary skill in the art, specific meanings of the above mentioned terms in the present disclosure can be understood according to specific circumstances.

In the present disclosure, unless otherwise clearly specified and defined, a first feature being above or below a second feature can include direct connection between the first and the second features, and also include that the first and the second features are not in direct contact but in contact though other features between them. Moreover, the first feature being above, over and on the second feature includes the first feature being immediately above or obliquely above the second feature, or merely indicates that a level of the first feature is higher than that of the second feature. The first feature being below, under and beneath the second feature includes the first feature being immediately below or obliquely below the second feature, or merely indicates a level of the first feature is lower than that of the second feature.

EXAMPLE 1

This example provides an exothermic welding cup 010, referring to FIG. 1, such exothermic welding cup 010 includes a cup 100, a cover 200 and an igniter 300.

The cup 100 is in a shape of a circular truncated cone, and the cup 100 is made of copper, allowing that during exothermic welding, the cup 100 can be directly melted to form liquid copper, producing no residue required to be manually removed.

An accommodating space 101 is formed inside the cup 100, wherein welding powder and a heating member 311 for igniting the welding powder can be placed in the accommodating space 101.

The circular truncated cone shaped cup 100 has an opening 110, the opening 110 being disposed on one surface, having a larger diameter, of the circular truncated cone, allowing the welding powder to be poured into the accommodating space 101 through the opening 110 easily. The opening 110 is further provided thereon with a flanging 111, wherein the flanging 111 can not only facilitate removing some overfilled welding powder, but also provide a basis for sealing at the opening 110.

Figure 2:
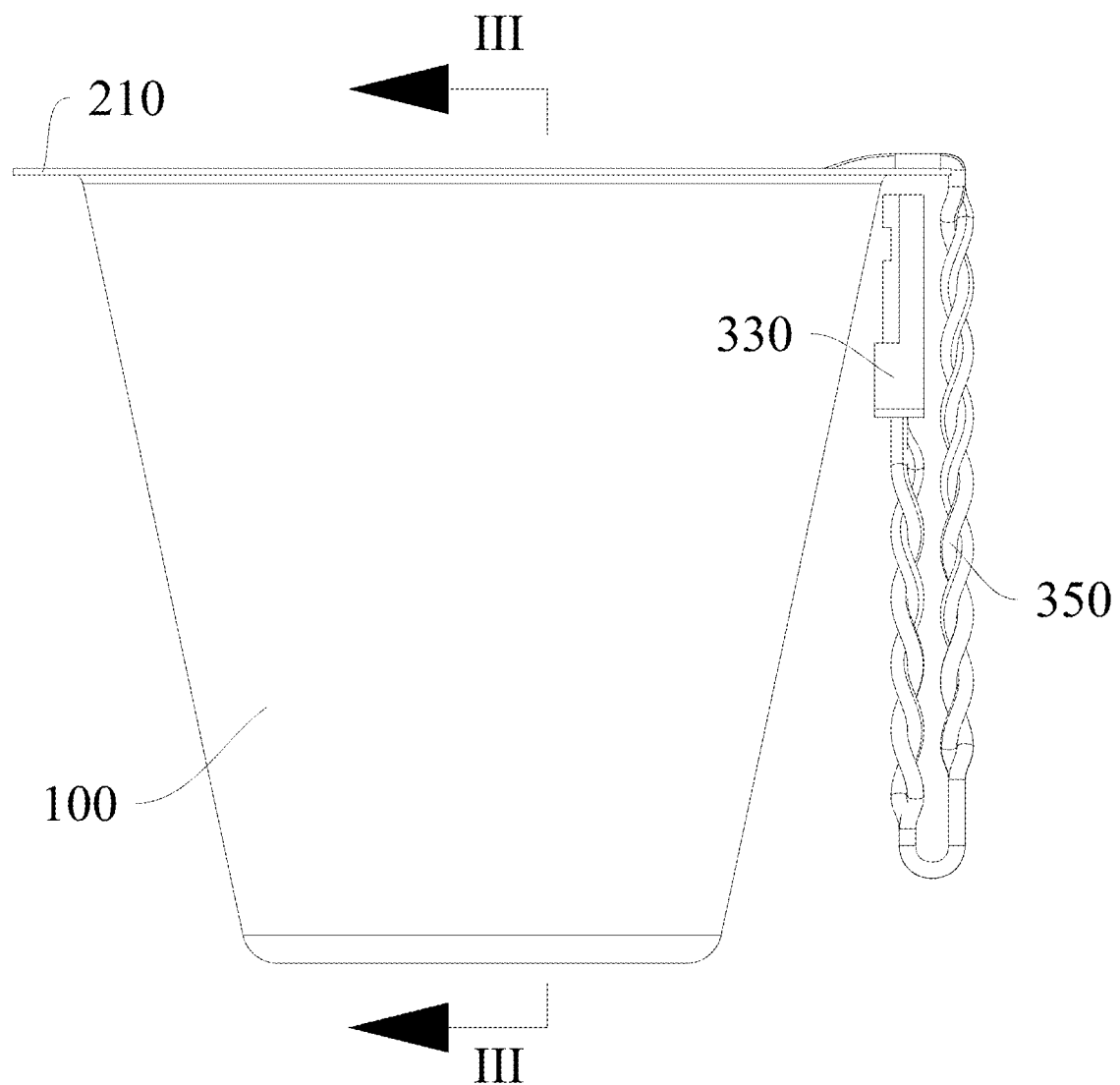
FIG. 2 is a schematic structural diagram of an exothermic welding cup provided in the example of the present disclosure, viewed from a second viewing angle.
Figure 3:
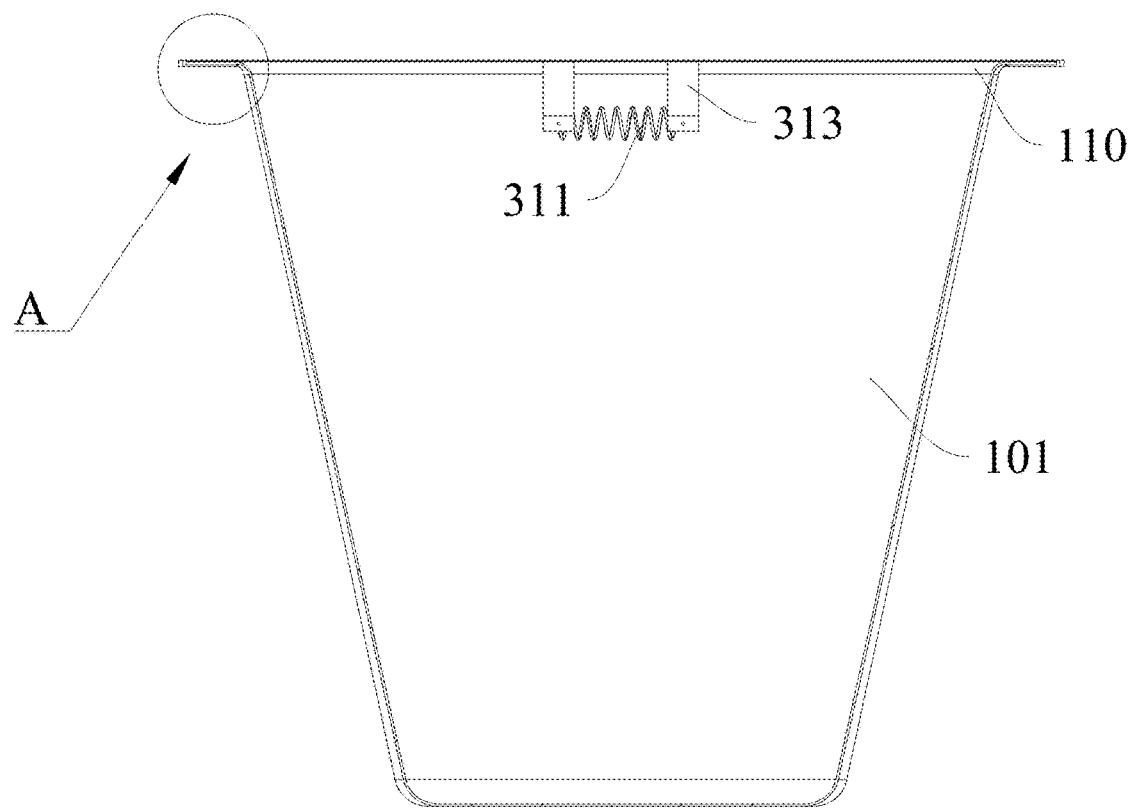
FIG. 3 is a cross sectional view along lines in FIG. 2.

Referring to FIG. 2 and FIG. 3, in this example, the cover 200 is connected to the igniter 300, wherein the igniter 300 includes a heating portion 310, a connecter 330 and a connecting line 350. The heating portion 310 includes the heating member 311, the heating member 311 being a spiral heating wire, which is formed by shaping a tungsten filament, wherein after powering up, the heating member 311 can generate considerable heat to reach a temperature capable of igniting the welding powder, and the high melting point of the tungsten filament also ensures that the heating member is less likely to be blown at a high temperature. The heating member 311 is electrically connected to the connector 330 via the connecting line 350, wherein the connector 330 is used to connect a power supply, providing power to the heating member 311 by the power supply.

In this example, the connector 330 includes a socket for connecting the power supply, namely the female connector commonly used in electronic devices. A conductive layer is disposed on an inner wall of the socket, the conductive layer being connected with the connecting line 350, powering the heating member 311 by inserting the male connector of the power supply into the female connector. In this example, to ensure voltage to concentrate on the heating member 311, the resistance of the connecting line 350 should be minimized, hence the connecting line 350 uses a copper core.

Since the cover 200 is also made of metal, the contact between the heating member 311 and the cover 200, may cause a shorting, wherein the current directly passes through the cover 200 rather than through the heating member 311, not only preventing the heating member 311 from generating heat, but also easily causing the current to be excessive to damage the power supply.

Figure 5:
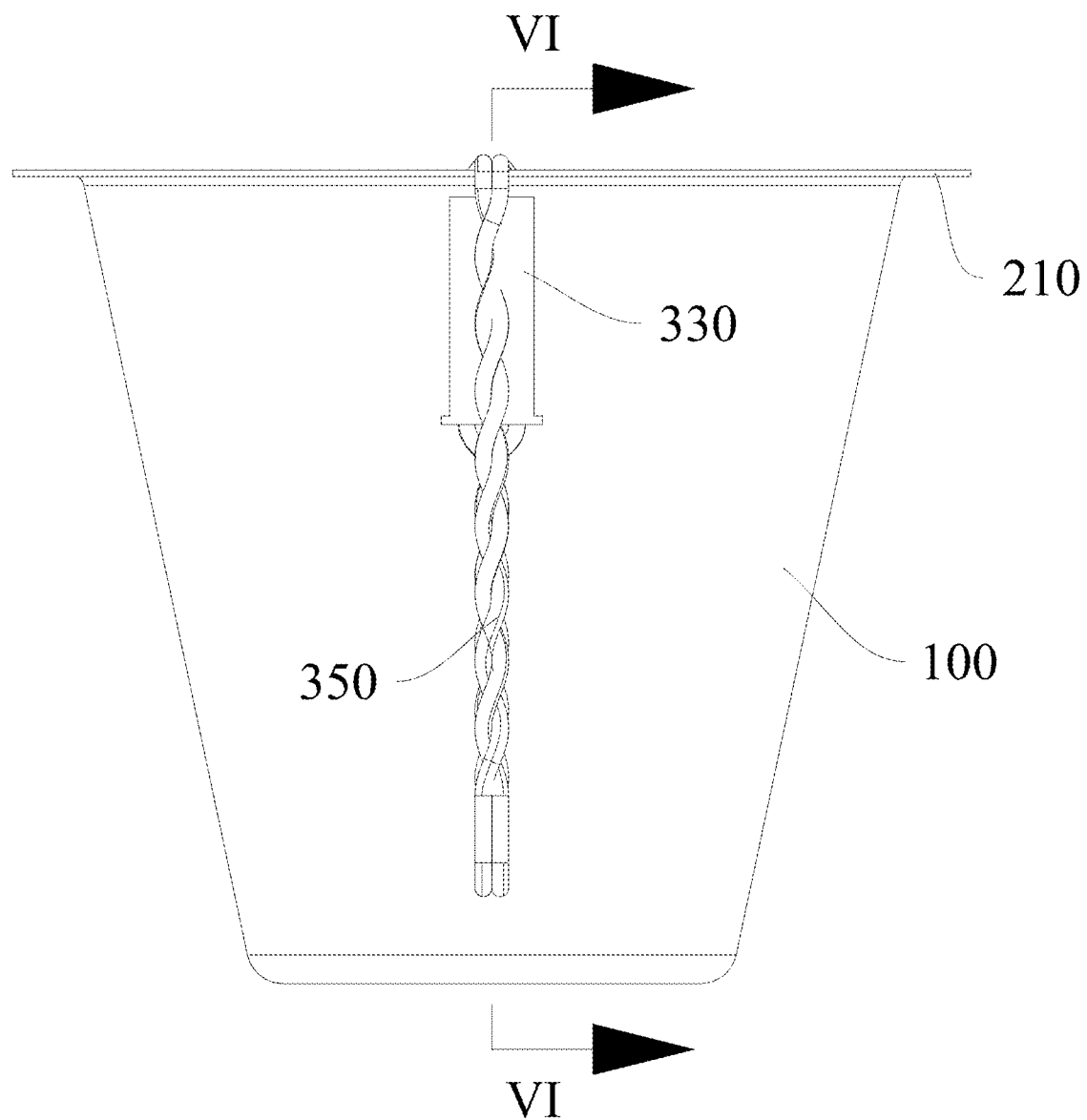
FIG. 5 is a schematic structural diagram of the exothermic welding cup provided in the example of the present disclosure, viewed from a third viewing angle.
Figure 6:
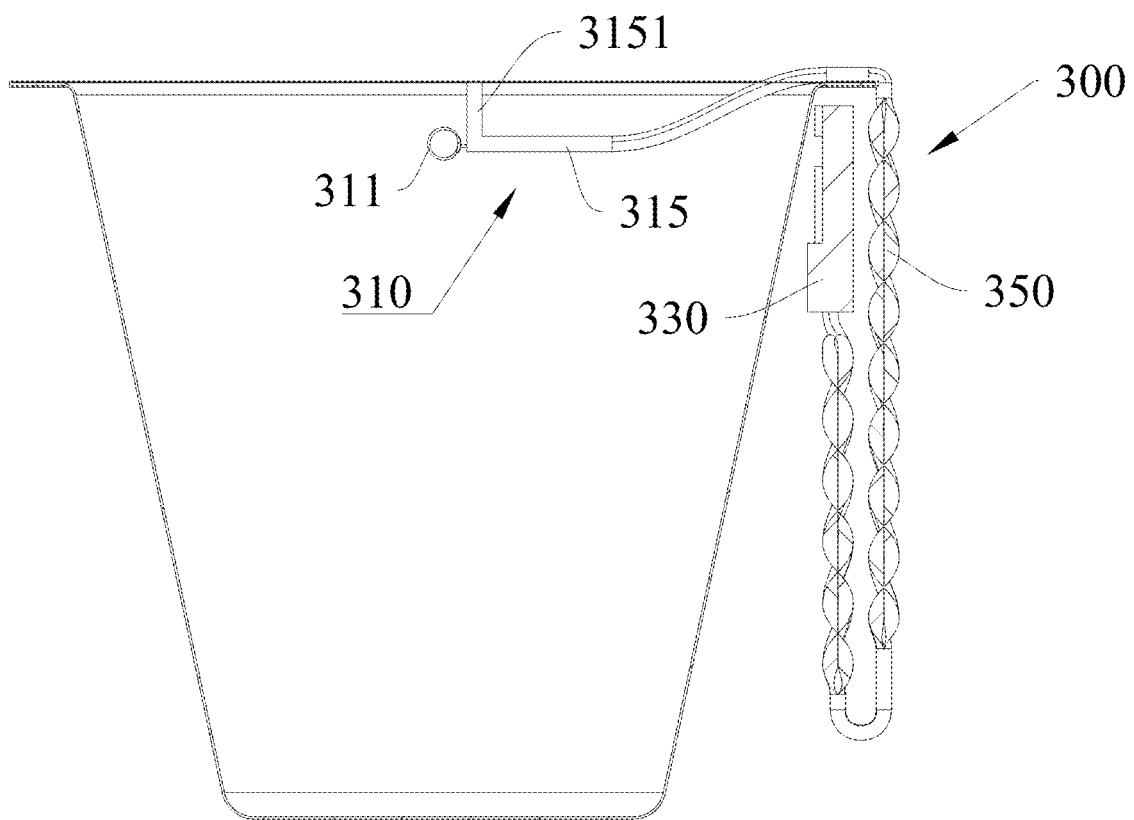
FIG. 6 is a cross sectional view along lines VI-VI in FIG. 5.

Referring to FIG. 5 and FIG. 6, in order to avoid the shorting, an insulating member 313 is disposed between the heating member 311 and the cover 200. In this example, two ends of the heating member 311 are connected to the connecting line 350 by using two spring leaves 315 to crimp, and the spring leaf 315 having a extension section 3151, wherein the extension section 3151 bents toward the cover 200. An insulating tip is disposed at an end of the extension section 3151, wherein the insulating tip in this example is then the insulating member 313, and the insulating tip is a PVC block. The PVC block is formed by the melted PVC material adhering to and solidified at the end of the extension section 3151, and the PVC material itself is non-conductive, causing its arrangement at the end of the extension section 3151 can therefore insulate the extension section 3151 (indirectly insulate the heating member 311) and the cover 200, preventing short circuit conditions. Other examples can also use the melted to adhere to the end of the extension section 3151 to form the insulating member 313.

In other examples, an insulating rod can also be specifically provided, two insulating rods being disposed between the two ends of the spiral heating wire, wherein one end of the insulating rod remote from the heating portion 310 abut against the cover 200, which can also prevent the heating member 311 from coming in contact with the cover 200.

An inside of the cup 100 is used to accommodate the welding powder, a particle size of the welding powder is generally small, to ensure the reaction rate and the thorough reaction, while the welding powder with small particle size tends to flow through the gap between the cup 100 and the cover 200.

Figure 7:
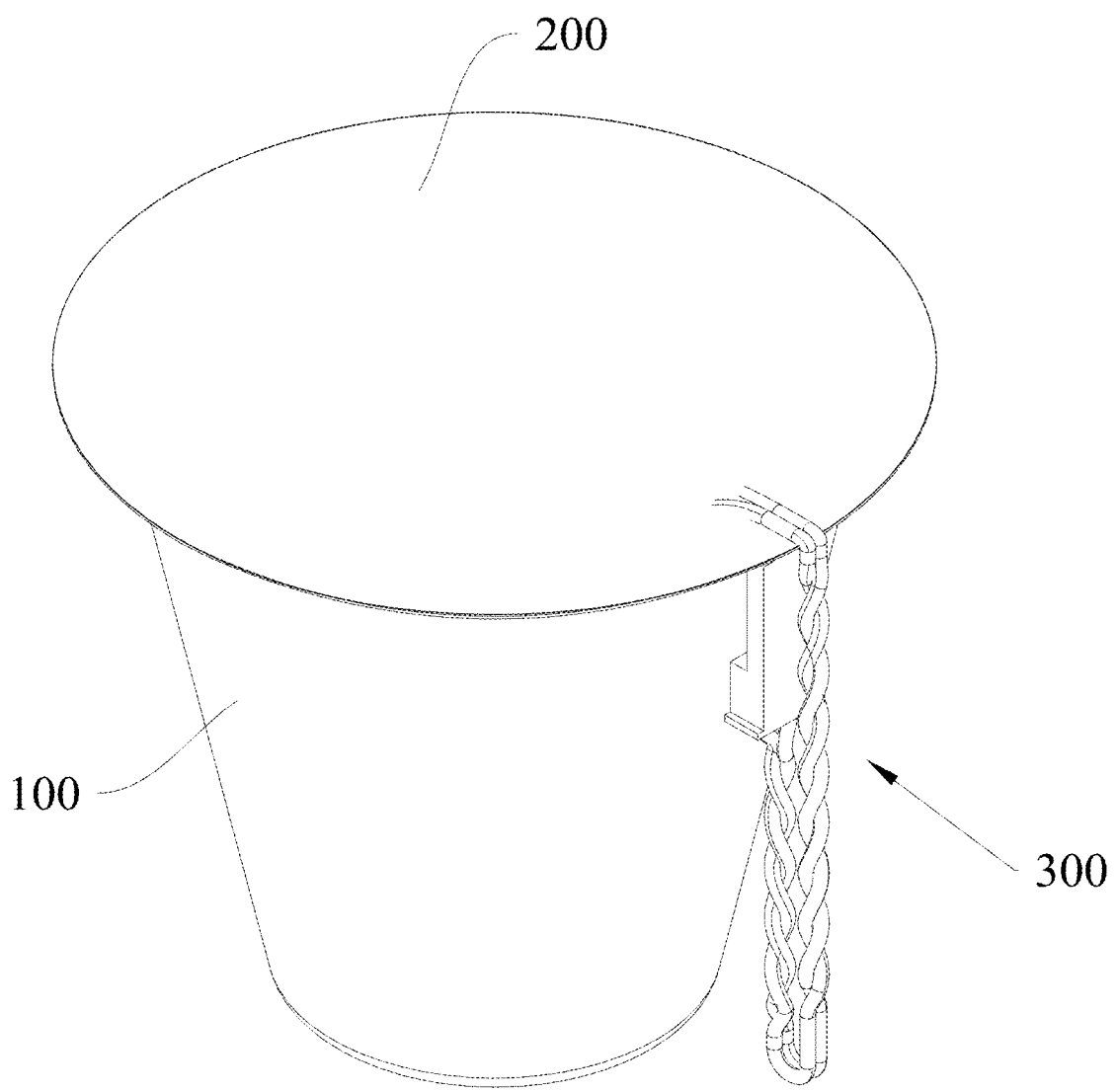
FIG. 7 is a schematic structural diagram of the exothermic welding cup not sealed by an encapsulation ring.

Referring to FIG. 7, in some examples, glue can be used to carefully bond the cover 200 to the flanging 111, ensuring the sealing performance, however the retention time of the glue is relatively short; and when in use, the high temperature generated in the cup 100, may cause failure of the glue, so that the welding powder may escape, reducing welding efficiency and welding effect.

Figure 4:
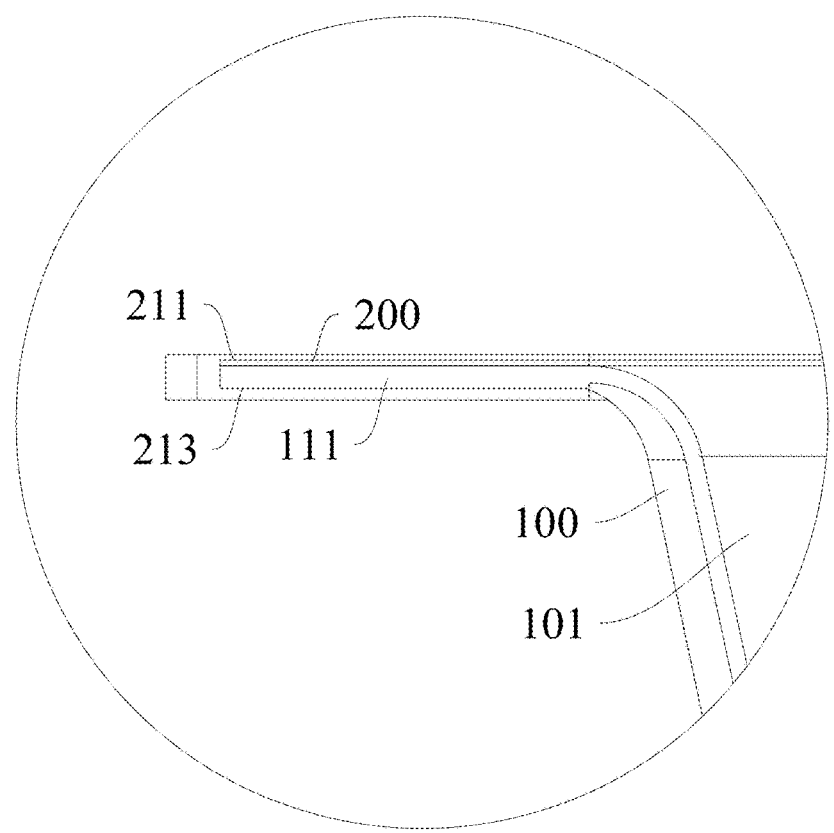
FIG. 4 is an enlarged view of the A region in FIG. 3.
Figure 8:
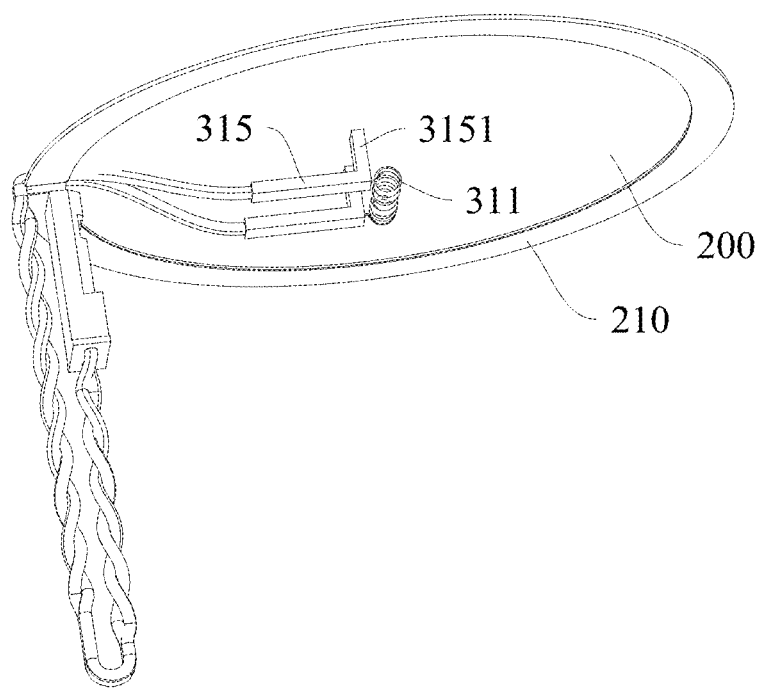
FIG. 8 is a schematic structural diagram of an igniter, connected to a cover, provided in the example of the present disclosure.

Referring to FIG. 3, FIG. 4 and FIG. 8, in this example, an encapsulation ring 210 is used to attach the cover 200 and the cup 100 tightly, and the encapsulation ring 210 can seal the gap between the cover 200 and the cup 100.

The encapsulation ring 210 has a first pressing surface 211 and a second pressing surface 213, a sealing groove being formed between the first pressing surface 211 and the second pressing surface 213, wherein an edge of the cover 200 and the flanging 111 of the cup 100 are both accommodated in the sealing groove. The flanging 111 has a first surface close to the cup 100 and a second surface remote from the cup 100, wherein the cover 200 covers the second surface, the first pressing surface 211 of the encapsulation ring 210 presses the cover 200 tightly, and the second pressing surface 213 presses the first surface of the flanging 111 tightly.

In this example, the encapsulation ring 210 is formed by pressing a stainless steel sheet, a first through hole being disposed in the middle of the stainless steel sheet, and the first through hole exposing the middle portion of the cover 200 after the encapsulation ring 210 being mounted on the cup 100.

Figure 9:
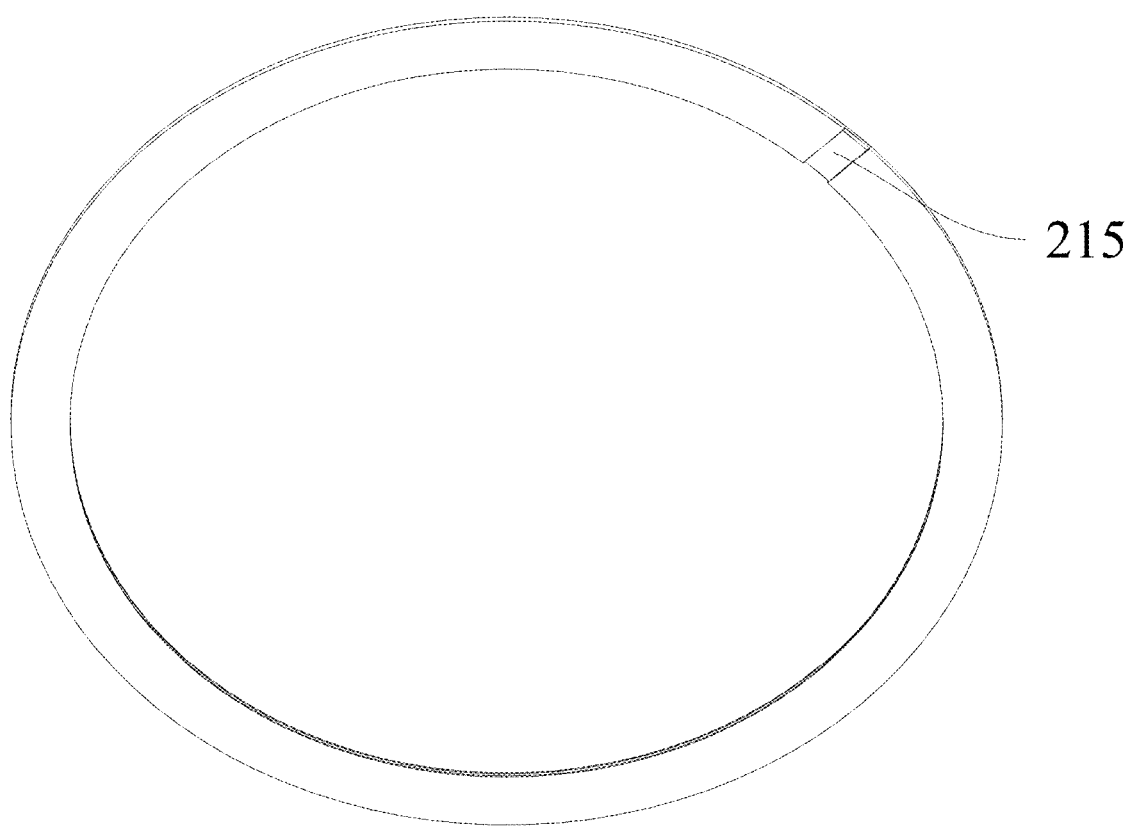
FIG. 9 is a schematic structural diagram of the encapsulation ring provided in the example of the present disclosure.

Referring to FIG. 9, one side of the stainless steel sheet is further provided with an indentation, after pressing, the indentation forms a wire slot 215 of the encapsulation ring 210, allowing the encapsulation ring 210 to seal the gap between the cover 200 and the cup 100, and to ensure the connecting line 350 of the igniter 300 to pass through, that is to say that the wire slot 215 is used for the connecting line to pass therethrough.

The exothermic welding cup 010 provided in the present disclosure can avoid contact between the heated heating member 311 and the cover 200, which the latter may cause shorting; and the encapsulation ring 210 configured to seal the welding powder within the cup 100 can prevent the powder from falling out, and in practical welding process, the encapsulation ring 210 made of stainless steel is not prone to failure, ensuring effective encapsulation of the welding powder in the cup 100 within a certain welding time.

EXAMPLE 2

This example provides an exothermic welding capsule, referring to FIG. 1, such exothermic welding capsule includes a cup 100, a cover 200, an igniter 300 and welding powder.

The cup 100 is in a shape of a circular truncated cone, and the cup 100 is made of copper, allowing that during exothermic welding, the cup 100 can be directly melted to form liquid copper, producing no residue required to be manually removed.

An accommodating space 101 is formed inside the cup 100, wherein the welding powder and a heating member 311 for igniting the welding powder can be placed in the accommodating space 101. After being placed in the accommodating space 101, the welding powder needs to be shaken until uniform and fully filling the space, ensuring that the heating member 311 of a heating portion 310 is covered.

The circular truncated cone shaped cup 100 has an opening 110, the opening 110 being disposed on one surface, having a larger diameter, of the circular truncated cone, allowing the welding powder to be poured into the accommodating space 101 through the opening 110 easily. The opening 110 is further provided thereon with a flanging 111, wherein the flanging 111 can not only facilitate removing some overfilled welding powder, but also provide a basis for sealing at the opening 110.

Referring to FIG. 2 and FIG. 3, in this example, the cover 200 is connected to the igniter 300, wherein the igniter 300 includes the heating portion 310, a connecter 330 and a connecting line 350. The heating portion 310 includes the heating member 311, the heating member 311 being a spiral heating wire, which is formed by shaping a tungsten filament, wherein after powering up, the heating member 311 can generate considerable heat to reach a temperature capable of igniting the welding powder, and the high melting point of the tungsten filament also ensures that the heating member is less likely to be blown at a high temperature. The heating member 311 is electrically connected to the connector 330 via the connecting line 350, wherein the connector 330 is used to connect a power supply, providing power to the heating member 311 by the power supply.

In this example, the connector 330 includes a socket for connecting the power supply, namely the female connector commonly used in electronic devices. A conductive layer is disposed on an inner wall of the socket, the conductive layer being connected with the connecting line 350, powering the heating member 311 by inserting the male connector of the power supply into the female connector. In this example, to ensure voltage to concentrate on the heating member 311, the resistance of the connecting line 350 should be minimized, hence the connecting line 350 uses a copper core.

Since the cover 200 is also made of metal, the contact between the heating member 311 and the cover 200, may cause a shorting, wherein the current directly passes through the cover 200 rather than through the heating member 311, not only preventing the heating member 311 from generating heat, but also easily causing the current to be excessive to damage the power supply.

Referring to FIG. 5 and FIG. 6, in order to avoid the shorting, an insulating member 313 is disposed between the heating member 311 and the cover 200. In this example, two ends of the heating member 311 are connected to the connecting line 350 by using two spring leaves 315 to crimp, and the spring leaf 315 having an extension section 3151, wherein the extension section 3151 bents toward the cover 200. An insulating tip is disposed at an end of the extension section 3151, wherein the insulating tip in this example is then the insulating member 313, and the insulating tip is a PVC block. The PVC block is formed by the melted PVC material adhering to and solidified at the end of the extension section 3151, and the PVC material itself is non-conductive, causing its arrangement at the end of the extension section 3151 can therefore insulate the extension section 3151 (indirectly insulate the heating member 311) and the cover 200, preventing short circuit conditions.

In other examples, an insulating rod can also be specifically provided, two insulating rods being disposed between the two ends of the spiral heating wire, wherein one end of the insulating rod remote from the heating portion 310 abut against the cover 200, which can also prevent the heating member 311 from coming in contact with the cover 200.

An inside of the cup 100 is used to accommodate the welding powder, a particle size of the welding powder is generally small, to ensure the reaction rate and the thorough reaction, while the welding powder with small particle size tends to flow through the gap between the cup 100 and the cover 200.

Referring to FIG. 7, in some embodiments, glue can be used to carefully bond the cover 200 to the flanging 111, ensuring the sealing performance, however the retention time of the glue is relatively short; and when in use, the high temperature generated in the cup 100, may cause failure of the glue, so that the welding powder may escape, reducing welding efficiency and welding effect.

Referring to FIG. 3, FIG. 4 and FIG. 8, in this example, an encapsulation ring 210 is used to attach the cover 200 and the cup 100 tightly, and the encapsulation ring 210 can seal the gap between the cover 200 and the cup 100.

The encapsulation ring 210 has a first pressing surface 211 and a second pressing surface 213, a sealing groove being formed between the first pressing surface 211 and the second pressing surface 213, wherein an edge of the cover 200 and the flanging 111 of the cup 100 are both accommodated in the sealing groove. The flanging 111 has a first surface close to the cup 100 and a second surface remote from the cup 100, wherein the cover 200 covers the second surface, the first pressing surface 211 of the encapsulation ring 210 presses the cover 200 tightly, and the second pressing surface 213 presses the first surface of the flanging 111 tightly.

In this example, the encapsulation ring 210 is formed by pressing a stainless steel sheet, a first through hole being disposed in the middle of the stainless steel sheet, and the first through hole exposing the middle portion of the cover 200 after the encapsulation ring 210 being mounted on the cup 100.

Referring to FIG. 9, one side of the stainless steel sheet is further provided with an indentation, after pressing, the indentation forms a wire slot 215 of the encapsulation ring 210, allowing the encapsulation ring 210 to seal the gap between the cover 200 and the cup 100, and to ensure the connecting line 350 of the igniter 300 to pass through, that is to say that the wire slot 215 is used for the connecting line to pass therethrough.

The exothermic welding cup 010 provided in the present disclosure can avoid contact between the heated heating member 311 and the cover 200, which the latter may cause shorting; and the encapsulation ring 210 configured to seal the welding powder within the cup 100 can prevent the powder from falling out, and in practical welding process, the encapsulation ring 210 made of stainless steel is not prone to failure, ensuring effective encapsulation of the welding powder in the cup 100 within a certain welding time.

The above are merely preferable examples of the present disclosure and are not used to limit the present disclosure. For one skilled in the art, various modifications and changes may be made to the present disclosure. Any amendments, equivalent replacements, improvements and so on, made without departing from the spirit and principle of the present disclosure, shall be covered by the scope of the present disclosure.

What is claimed is:

1. An exothermic welding cup, comprising:
a cup for accommodating welding powder, and the cup having an opening;
a cover for covering the opening; and
an igniter comprising a heating portion, the heating portion being disposed in the cup, and the heating portion having an insulating member and a heating member, wherein the insulating member is disposed between the heating member and the cover,
wherein the heating member is a spiral heating wire, the insulating member comprises two insulating rods, one of the insulating rods is disposed on one end of the spiral heating wire, and the other of the insulating rods is disposed on the other end of the spiral heating wire.

2. The exothermic welding cup of claim 1, wherein the igniter further comprises a connecting line for connecting to a power supply, the heating member is crimped to the connecting line by a spring leaf, the spring leaf has an extension section extending toward the cover, and the insulating member is an insulating tip fixedly disposed at an end of the extension section.

3. The exothermic welding cup of claim 2, wherein the insulating tip is a PVC block or a silica gel block.

4. The exothermic welding cup of claim 2, wherein a connector is disposed at one end of the connecting line away from the igniter, the connector comprises a socket, a conductive layer is disposed on an inner wall of the socket, and the conductive layer is connected to the connecting line.

5. The exothermic welding cup of claim 2, further comprising an encapsulation ring,
wherein the encapsulation ring comprises a first pressing surface and a second pressing surface, and a flanging disposed on a surface of the cup on which the opening is disposed,
wherein the flanging has a first surface adjacent to the cup and a second surface away from the cup, the cover covers the second surface, the first pressing surface of the encapsulation ring presses the cover, and the second pressing surface presses the first surface.

6. The exothermic welding cup of claim 5, wherein a first through hole is disposed in the middle of the encapsulation ring.

7. The exothermic welding cup of claim 5, wherein the encapsulation ring has a wire slot, and the wire slot is configured for the connecting line to pass therethrough.

8. The exothermic welding cup of claim 1, wherein the cup is a copper cup.

9. An exothermic welding capsule, comprising the exothermic welding cup according to claim 1 and welding flux, wherein the welding flux is disposed within the cup.

10. The exothermic welding capsule of claim 9, wherein the igniter further comprises a connecting line for connecting to a power supply, the heating member is crimped to the connecting line by a spring leaf, the spring leaf has an extension section extending toward the cover, and the insulating member is an insulating tip fixedly disposed at an end of the extension section.

11. The exothermic welding capsule of claim 10, wherein the insulating tip is a PVC block or a silica gel block.

12. The exothermic welding capsule of claim 10, wherein a connector is disposed at one end of the connecting line away from the igniter, the connector comprises a socket, a conductive layer is disposed on an inner wall of the socket, and the conductive layer is connected to the connecting line.

13. The exothermic welding capsule of claim 10, further comprising an encapsulation ring, wherein the encapsulation ring comprises a first pressing surface and a second pressing surface, and a flanging disposed on a surface of the cup on which the opening is disposed, wherein the flanging has a first surface adjacent to the cup and a second surface away from the cup, the cover covers the second surface, the first pressing surface of the encapsulation ring presses the cover, and the second pressing surface presses the first surface.

14. The exothermic welding capsule of claim 13, wherein a first through hole is disposed in the middle of the encapsulation ring.

15. The exothermic welding capsule of claim 13, wherein the encapsulation ring has a wire slot, and the wire slot is configured for the connecting line to pass therethrough.

16. The exothermic welding capsule of claim 9, wherein the cup is a copper cup.

\* \* \* \* \*